July 3, 1962　　　M. CZIRFUSZ　　　3,042,209
METHOD FOR THE CONTINUOUS PURIFICATION OF
LIME MILK USED IN SUGAR MILLS
Filed Dec. 17, 1958
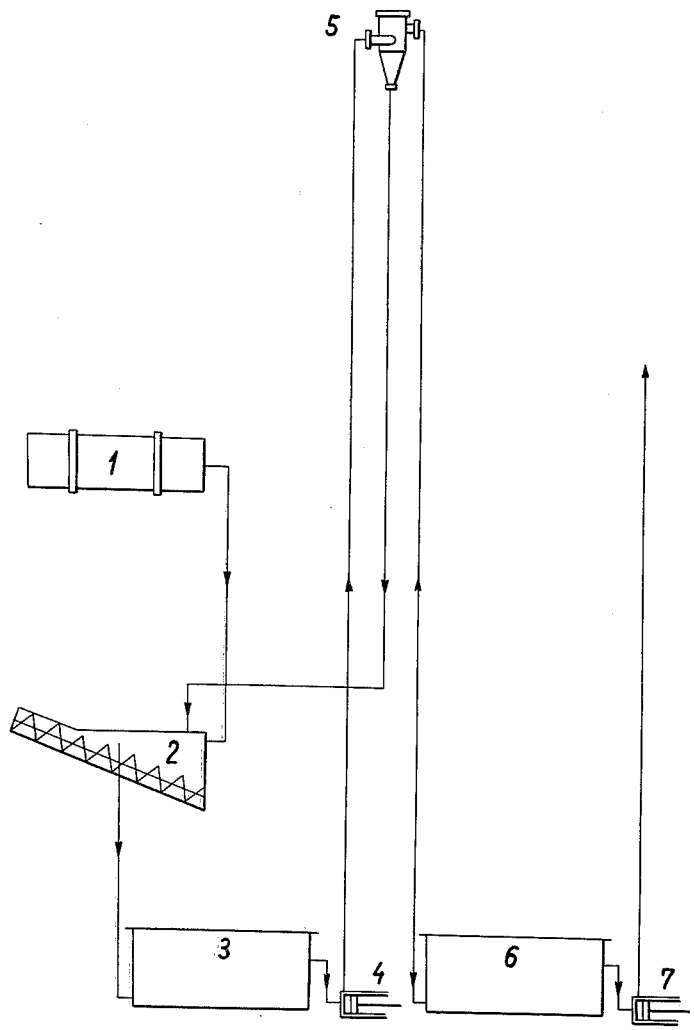
INVENTOR.
MIKLÓS CZIRFUSZ
BY
Irwin S. Thompson
ATTY.

ized July 3, 1962

3,042,209
METHOD FOR THE CONTINUOUS PURIFICATION OF LIME MILK USED IN SUGAR MILLS
Miklós Czirfusz, Petohaza, Hungary, assignor to Licencia Talámányokat Értékesitö Vállalat, a firm
Filed Dec. 17, 1958, Ser. No. 781,116
1 Claim. (Cl. 210—73)

The present invention relates to a method for the continuous purification of lime milk used in sugar mills, and its main object is to permit continuous removal of the contaminations contained in the impure lime milk.

For purifying sugar factory juices solely lime milk is used. Lime milk is apt to produce chemical compounds with the impurities contained in the raw juice, in such a way that these compounds form filterable materials upon the effect of the carbon dioxide gas subsequently introduced therein. Thus, it is possible to prevent the losses in sugar arising through fermentation in the alkalized juice. Lime milk is produced from hydraulic lime by lime kilning on the premises of the sugar mill, to which purpose limestone and coke are used. The hydraulic lime coming from the lime kiln contains impurities. Since such impurities cannot be removed before slaking either by physical or chemical methods, one has to resort to purification subsequent to the slaking.

The purpose of purification of the lime milk is to supply pure lime milk for the manufacturing process, so as to promote the chemical processes referred to above. The use of pure lime milk is among others advantageous because if the lime milk is contaminated, the pipes are subjected to choking or obstruction which in turn may lead to heavy breakdowns.

Up to now the most widely used method for purifying lime milk was to lead it after the slaking drum into a cylinder provided with a mixer or agitator, a more or less large amount of sand being allowed to deposit on the bottom of said cylinder. According to another known method the contaminated lime milk was fed into a depositing system having a metallic sieve. Generally, two depositing tanks were used whence the cleaned lime milk was conveyed to the sugar mill by means of a piston pump. Furthermore, the use of sand filters or quartz filters was suggested for purifying lime milk. However, in normal industrial conditions the maximum efficiency of cleaning to be achieved by these known methods was 80 percent, so that a more or less heavy choking of the pipes by the lime milk occurred almost without exception, involving breakdowns in the sugar mills.

For cleaning the impure lime milk emerging from the slaking drum tests have also been carried out by the use of hydrocyclones, and the efficiency of the cleaning proved to be higher than are the above figures.

A common disadvantage of the above mentioned conventional methods is that the separated impurities could be removed only periodically from the separator or from the settling tank. The sand or other contaminations have been removed during standstills, manually or by mechanical methods, for example, by means of a chain pump.

The most important purpose of the invention is the continuous production of lime milk used in sugar mills in a completely purified state.

According to a preferred feature of the invention, the lime milk issuing from the slaking drum, instead of being fed into a separator, is fed into an inclined-bottom settling tank of substantial size, for example, of approximately 5 to 6 cubic metres volume. A device for the removal of the impurities, preferably a worm conveyor, is arranged on the bottom part of said tank. The coarse impurities of the lime milk settle at the bottom of the tank, while the lime milk containing the fine impurities, amounting for example to some 50 grams per liter of lime milk are fed to the hydrocyclone. Obstruction of the hydrocyclone thus being practically eliminated, continuous cleaning thereof is easily possible. The amount of impurities present in the lime milk depends on the amount of impurities contained in the limestone and coke employed as starting materials for the production of the lime milk. It is understood that the amount of impurities stated above, i.e. 50 g./l. is but an average value subject to variation within wide limits. A device for the continuous removal of impurities, preferably an Archimedean screw conveyor, is provided in the tank. Such a device must be so constructed as to enable the liquid lime milk still contained between the sedimented sand particles to reflow to the tank owing to the inclination of the bottom of the tank, in order to avoid lime milk losses. When a worm conveyor is employed, preferably slots or cutouts are to be provided in the worm for said purpose. The combination of the settling tank with the worm conveyor permits continuous and unobstructed lime milk supply to the hydrocyclone, whereby the inconvenient disadvantages referred to above can be entirely removed, and continuous cleaning of the lime milk is ensured.

According to the invention the impure lime milk issuing from the slaking drum is fed into a slanting bottom settling tank provided with a device for removal of the impurities, preferably a worm conveyor and is then pumped into a hydrocyclone, from which clean lime milk as well as sludge (turbid lime milk) result. The clean lime milk is introduced into a receiver from which it is pumped into the sugar mill, while the sludge resulting from the hydrocyclone is fed back into the settling tank. The impurities set or deposited in said tank are continuously removed therefrom by means of said worm conveyor.

The aim of the present invention can be achieved with more security if the lime milk removed from the settling tank is fed to a receiver tank arranged before the piston pump. From this receiver tank the lime milk still containing usually at least 50 grams sand per liter is conveyed by means of the piston pump into the battery of hydrocyclones. An operating pressure of 1 to 2.5 atm. gauge pressure is employed, varying within this range in accordance with the working conditions of the piston pump. The diameter of the hydrocyclone employed is, for example, approximately 150 mm., it being an essential condition of creating therein a minimum acceleration of 45 $g$ for the solid particles to be removed. It was proved in practice that by the method according to the invention, in normal industrial conditions, efficiency of purification of the lime milk amounted to 100 percent, even though pressure was fluctuating.

Generally a lime milk of 20 Bé. is supplied by the hydrocyclone, in a quantity of 150 to 180 liters/min. Hence, in factories processing 2500 tons of beets per day, two cyclones are sufficient for producing the necessary quantity of lime milk. In practice, however, it may be found advantageous to use four cyclones so coupled to one another that two of them shall continuously work, while the other two serve emergency purposes in the event that the filter basket situated under the pump should allow larger particles to pass whereby the cyclone may be choked. Practically constant pressure is maintained by feed pipes arranged before the cyclones forming said battery, and the pressure may be constant if instead of a piston pump, a centrifugal pump or gear pump is used.

One embodiment of the invention will be now described in connection with the enclosed drawing.

The impure lime milk streams from the slaking drum 1 into a settling tank 2 provided with a worm conveyor, and from this settling tank 2 the lime milk flows into a receiver or tank 3. From the tank 3 the lime milk is pressed by means of a piston pump 4 into the battery of hydrocyclones 5. Hence the purified juice is fed first into a receiver 6 and then pumped by a piston pump 7 to the sugar mill for use. The sludge flowing out of the lower part of the cyclone is led back to the settling tank 2. The endless worm of said settling tank 2 continuously removes the sand and other impurities therefrom.

I claim:

A method for the continuous purification of lime milk to be used in sugar mills comprising the steps of
producing impure lime milk having solid impurities therein,
introducing said impure lime milk containing said solid impurities into a space wherein said solid impurities settle to the bottom of said space,
continuously removing said solid impurities from a portion of said space while said lime milk is being introduced therein,
continuously feeding the lime milk substantially free of said solid impurities from another portion of said space into a receiving space,
continuously conveying the lime milk from said receiving space into a cyclonizing zone wherein the lime milk is divided into pure lime milk and sludge,
continously feeding the pure lime milk into a further receiving space from which the pure lime milk is to be fed to the sugar mill for use thereby,
and continuously removing the sludge from said cycylonizing zone and feeding the sludge into said first-named space.

References Cited in the file of this patent

UNITED STATES PATENTS 2,654,479     Driessen _____ Oct. 6, 1953

FOREIGN PATENTS 1,115,397     France _____ Dec. 26, 1955